United States Patent
Choi et al.

(10) Patent No.: US 11,436,497 B2
(45) Date of Patent: Sep. 6, 2022

(54) SYSTEM AND METHOD FOR OPTIMIZATION OF DEEP LEARNING MODEL

(71) Applicant: SAMSUNG SDS CO., LTD., Seoul (KR)

(72) Inventors: Jong-Won Choi, Seoul (KR); Young-Joon Choi, Seoul (KR); Ji-Hoon Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 547 days.

(21) Appl. No.: 16/665,630

(22) Filed: Oct. 28, 2019

(65) Prior Publication Data

US 2020/0134472 A1  Apr. 30, 2020

(30) Foreign Application Priority Data

Oct. 29, 2018  (KR) .......................... 10-2018-0130200

(51) Int. Cl.
*G06N 3/08* (2006.01)
*G06N 3/04* (2006.01)

(52) U.S. Cl.
CPC ........... *G06N 3/088* (2013.01); *G06N 3/0454* (2013.01)

(58) Field of Classification Search
None
See application file for complete search history.

(56) References Cited

U.S. PATENT DOCUMENTS

| | | | |
|---|---|---|---|
| 2015/0120626 A1 | 4/2015 | Gupta et al. | |
| 2017/0068871 A1* | 3/2017 | Abdulkader | G06K 9/6269 |
| 2018/0268296 A1* | 9/2018 | Zheng | H04L 41/16 |
| 2019/0205747 A1* | 7/2019 | Srivastava | G06N 3/0454 |
| 2020/0082013 A1* | 3/2020 | Triplet | G06K 9/00496 |

OTHER PUBLICATIONS

"Zhang et al., Deep Transfer Network: Unsupervised Domain Adaptation" (Year: 2015).*

* cited by examiner

*Primary Examiner* — Hilina K Demeter
(74) *Attorney, Agent, or Firm* — The PL Law Group, PLLC

(57) ABSTRACT

Provided are an optimization system and method of a deep learning model. According to example embodiments, by optimizing the structure of the deep learning model appropriately for a target dataset without fixing the structure of the deep learning model, it is possible to generate a model structure capable of having high performance on the target dataset and also saving resources.

14 Claims, 7 Drawing Sheets

SYSTEM AND METHOD FOR OPTIMIZATION OF DEEP LEARNING MODEL

CROSS-REFERENCE TO RELATED APPLICATION

This application claims priority to and the benefit of Korean Patent Application No. 10-2018-0130200, filed on Oct. 29, 2018, the disclosure of which is incorporated herein by reference in its entirety.

BACKGROUND

1. Field

Exemplary embodiments relate to a technique for optimizing a deep learning model structure.

2. Discussion of the Related Art

Deep learning, which is a technical methodology used to cluster or classify data such as images, needs a lot of data to produce accurate results and essentially requires the existence of a source dataset for supervised learning. A source dataset is a set of data to which a class is assigned and may be composed of pairs of inputs and labels. However, the source dataset requires a lot of labor because users should assign a class to each image directly.

An unsupervised domain adaptation technique is a methodology capable of solving this problem, and a target dataset to which no class is assigned is learned based on a source dataset to which a class is allocated. However, the conventional unsupervised domain adaptation technique has a limitation in that users have to design a deep learning model structure (i.e., a network structure) in advance. Here, the deep learning model structure is a layer set structure and includes, for example, the number or dimension of channels, the number of parameters, and the like, of each layer. According to the conventional unsupervised domain adaptation technique, a target dataset is learned based on a deep learning model structure optimized for a source dataset. Thus, when information in the target dataset is larger than information in the source dataset, the size of the model structure is not sufficient, and thus the deep learning model may exhibit low performance. On the contrary, when information in the target dataset is smaller than information in the source dataset, a large fixed model is used even though the size of the model structure can be further reduced, thereby wasting resources.

SUMMARY

Embodiments of the present disclosure are directed to discovering the structure of a deep learning model optimized for a target dataset by repeatedly changing the initial structure of the deep learning model on the basis of the relative amount of information of the target dataset and source data while learning the target dataset on the basis of the source dataset.

According to an aspect of the present disclosure, there is provided an optimization system of a deep learning model including a feature extraction network having a plurality of layers for performing feature extraction on input data corresponding to a source dataset to which a class is assigned or a target dataset to which no class is assigned, and a classification network including a plurality of classifiers for outputting one class corresponding to the source dataset on the basis of an extracted feature and a discrimination unit configured to determine whether the input data corresponds to the source dataset or the target dataset, the optimization system including a first learning unit configured to repeatedly learn the feature extraction network and the classification network using an unsupervised domain adaptation technique; a second learning unit having a first model for increasing a layer size, a second model for maintaining a layer size, and a third model for decreasing a layer size, the second learning unit configured to select one of the plurality of layers and acquire learned results when the first model, the second model size, and the third model are applied to the selected layer on the basis of the source dataset; and an optimization unit configured to select one of the first model, the second model, and third model according to the learned results of the second learning unit and adjust a size of the selected layer according to the selected model.

The first learning unit may be further configured to repeatedly learn the feature extraction network and the classification network such that the feature extraction network and the classification network become a generator and a discriminator of a generative adversarial network (GAN), respectively, in order to improve performance of the feature extraction network and the classification network.

The second learning unit may be further configured to randomly select one of the plurality of layers and then randomly select another one of the plurality of layers again after the randomly selected layer is adjusted in size by the optimization unit.

The second learning unit may be further configured to acquire learned results when the first model, the second model, and the third model are applied to the selected layer on the basis of the source dataset while maintaining the feature extraction network and the classification network learned in the first learning unit.

The plurality of classifiers may comprise a first classifier and a second classifier, and the second learning unit may be further configured to learn the first model, the second model, and the third model for the selected layer such that the probability that the first classifier and the second classifier correctly output classes corresponding to the source dataset is increased.

The optimization unit may be further configured to select a model having a smallest loss from among the first model, the second model, and the third model according to the learned results of the second learning unit.

The optimization unit may be further configured to adjust a size of each of the plurality of layers until the second model is repeatedly selected for each of the plurality of layers according to the learned results of the second learning unit.

According to another aspect of the present disclosure, there is an optimization method of a deep learning model including a feature extraction network having a plurality of layers for performing feature extraction on input data corresponding to a source dataset to which a class is assigned or a target dataset to which no class is assigned, and a classification network including a plurality of classifiers for outputting one class corresponding to the source dataset on the basis of an extracted feature and a discrimination unit configured to determine whether the input data corresponds to the source dataset or the target dataset, the optimization method comprising: repeatedly learning, by a first learning unit, the feature extraction network and the classification network using an unsupervised domain adaptation technique; selecting, by a second learning unit having a first model for increasing a layer size, a second model for maintaining a layer size, and a third model for decreasing a layer size, one of the plurality of layers; acquiring, by the second learning unit, learned results when the first model, the second model, and the third model are applied to the selected layer on the basis of the source dataset; selecting, by an optimization unit, one of the first model, the second model, and third model according to the learned results of the second learning unit; and adjusting, by the optimization unit, a size of the selected layer according to the selected model.

The repeatedly learning of the feature extraction network and the classification network may comprise: repeatedly learning the feature extraction network and the classification network such that the feature extraction network and the classification network become a generator and a discriminator of a generative adversarial network (GAN), respectively, in order to improve performance of the feature extraction network and the classification network.

The selecting of one of the plurality of layers may comprise: randomly selecting one of the plurality of layers and then randomly selecting another one of the plurality of layers again after the randomly selected layer is adjusted in size by the optimization unit.

The acquiring of the learned results may comprise: acquiring the learned results when the first model, the second model, and the third model are applied to the selected layer on the basis of the source dataset while the feature extraction network and the classification network learned in first learning unit are maintained.

The plurality of classifiers may comprise a first classifier and a second classifier, and the acquiring of the learned results may comprise: learning the first model, the second model, and the third model for the selected layer such that the probability that the first classifier and the second classifier correctly output classes corresponding to the source dataset is increased.

The selecting of one of the first model, the second model, and the third model according to the learned results of the second learning unit may comprise: selecting a model having a smallest loss from among the first model, the second model, and the third model according to the learned results of the second learning unit.

The adjusting of the size of the selected layer may comprise: adjusting a size of each of the plurality of layers until the second model is repeatedly selected for each of the plurality of layers according to the learned results of the second learning unit.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION

Hereinafter, exemplary embodiments of the present disclosure will be described with reference to the accompanying drawings.

The following detailed description is provided to assist the reader in gaining a comprehensive understanding of methods, apparatuses, and/or systems described herein. However, this is merely an example, and the present disclosure is not limited thereto.

In describing embodiments of the present disclosure, when it is determined that a detailed description of a known technique associated with the present disclosure would unnecessarily obscure the subject matter of the present disclosure, the detailed description will be omitted. Also, terms used herein are defined in consideration of functions used in the present disclosure and may be changed depending on a user, the intent of an operator, or a custom. Therefore, the definitions should be made based on the contents throughout the specification. The terminology used herein is only for the purpose of describing embodiments of the present disclosure and should not be limiting. The singular forms "a," "an," and "the" are intended to include the plural forms as well, unless the context clearly indicates otherwise. It should be understood that the terms "comprises," "comprising," "includes,": and/or "including" specify the presence of stated features, integers, steps, operations, elements, components, and/or groups thereof when used herein, but do not preclude the presence or addition of one or more other features, integers, steps, operations, elements, components, and/or groups thereof.

Figure 1:
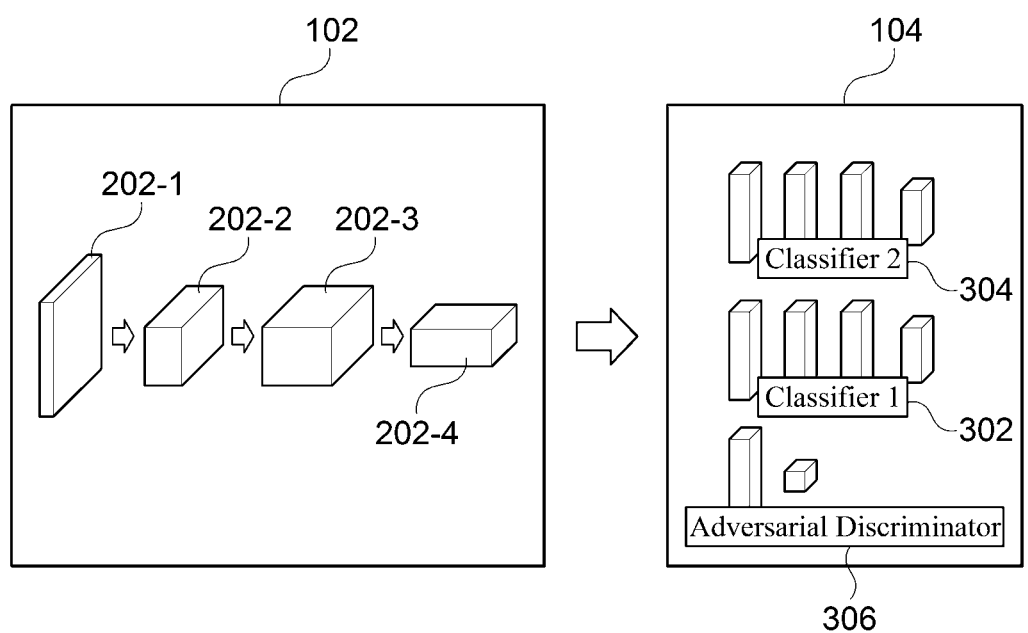
FIG. 1 illustrates a deep learning model according to an example embodiment.

FIG. 1 illustrates a deep learning model 100 according to an example embodiment. In this embodiment, the deep learning model 100 is a model used to cluster or classify data such as images and may be a deep neural network (DNN), a convolutional neural network (CNN), or the like. The deep learning model 100 may receive input data from the outside and provide output data for the input data. In this case, the deep learning model 100 may be pre-provided with a source dataset to which a class is assigned. Also, the input data may correspond to the source dataset or a target dataset to which the class is assigned.

As shown in FIG. 1, the deep learning model 100 according to an example embodiment includes a feature extraction network 102 and a classification network 104.

The feature extraction network 102 has a plurality of layers for performing feature extraction on the input data. The plurality of layers 202-1, 202-2, 202-3, and 202-4 may be, for example, a convolution layer, a pooling layer, and the like and may consist of several stacked layers. One or more filters for feature extraction may be applied to input data introduced into the plurality of layers 202-1, 202-2, 202-3, and 202-4. Here, the layers in the front stage of the feature extraction network 102 may extract low-dimensional features of the input data (e.g., extraction of straight lines, circles, and the like from an input image), and the layers in the rear stage of the feature extraction network 102 may extract high-dimensional features of the input data (e.g., extraction of a cat's eyes, nose, ears, and the like from the input image). In this case, the layers 202-1, 202-2, 202-3, and 202-4 may differ from each other with respect to size (e.g., the number or dimension of channels, the number of parameters, etc.). Here, for convenience of description, only four layers 202-1, 202-2, 202-3, and 202-4 are illustrated. However, this is merely an example, and the number of layers is not particularly limited.

The classification network 104 classifies the class of input data on the basis of features extracted by the feature extraction network 102. In this case, the classification network 104 may include a plurality of classifiers 302 and 304 and a discriminator unit 306.

The classifiers 302 and 304 may output one class corresponding to the source dataset on the basis of features extracted by the feature extraction network 102. As shown in FIG. 1, the classifiers 302 and 304 may include a first classifier 302 and a second classifier 304.

The first classifier 302 and the second classifier 304 may be used to classify the class of the input data on the basis of the pre-provided source dataset, but may have different internal parameter values, weights, and the like. The first classifier 302 and the second classifier 304 may classify the class of input data using, for example, a softmax function.

The discriminator unit 306 discriminates whether the input data corresponds to the pre-provided source dataset or to the target dataset.

The above-described deep learning model 100 may learn the target dataset using an unsupervised domain adaptation technique. However, according to the conventional unsupervised domain adaptation technique, a target dataset is learned based on the structure of the deep learning model 100 optimized for the source dataset. Thus, when information in the target dataset is larger than information in the source dataset, the size of the model structure is not sufficient, and thus the deep learning model 100 may exhibit low performance. On the contrary, when information in the target dataset is smaller than information in the source dataset, a large fixed model is used even though the size of the model structure can be further reduced, thereby wasting resources.

A method of discovering the structure of the deep learning model 100 optimized for the target dataset by repeatedly changing the initial structure of the deep learning model 100 on the basis of the relative amount of information of the target dataset and the source data while learning the target dataset on the basis of the source dataset will be described below.

Figure 2:
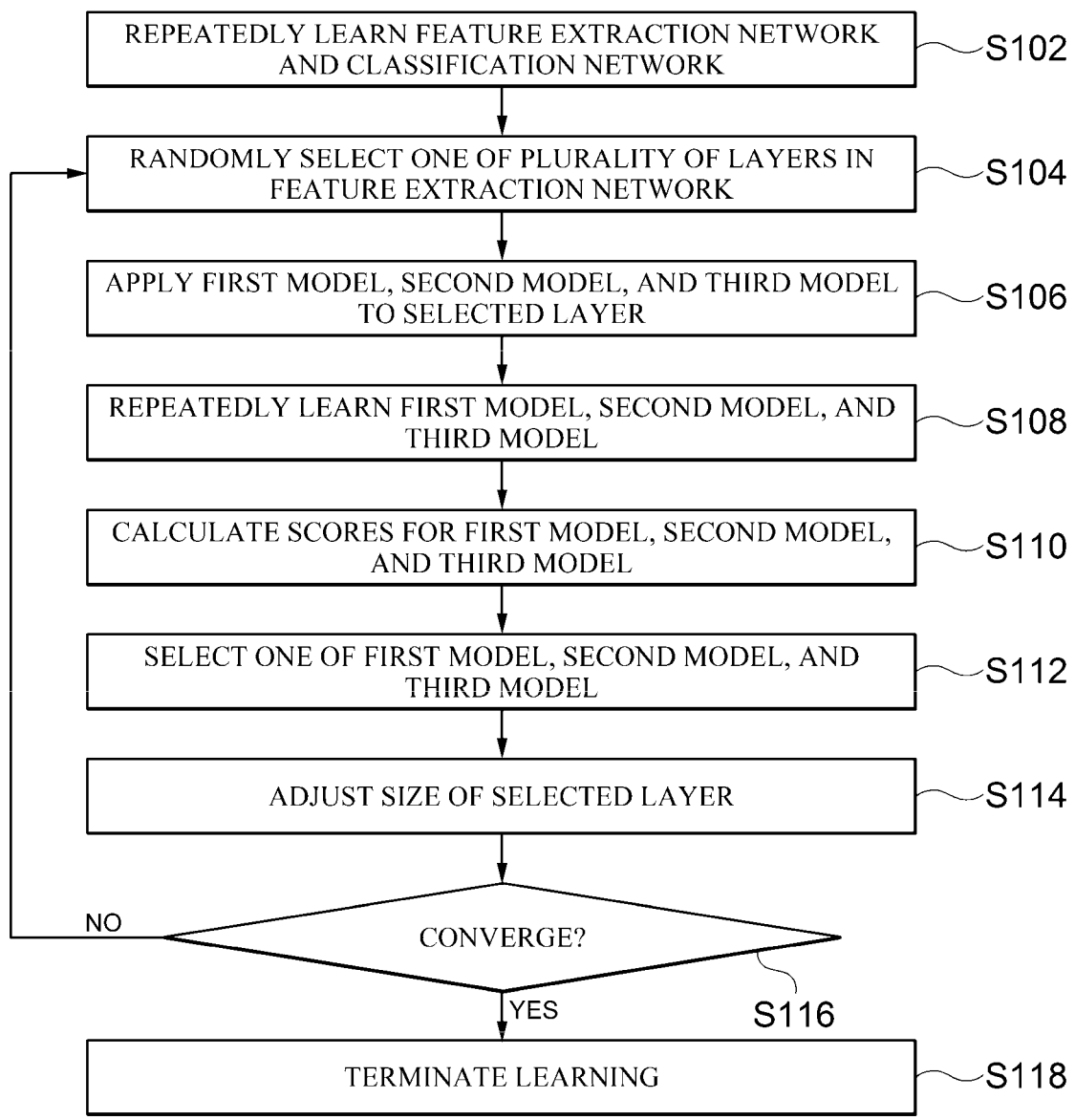
FIG. 2 is a flowchart illustrating a method of optimizing a deep learning model according to an example embodiment.

FIG. 2 is a flowchart illustrating a method of optimizing the deep learning model 100 according to an example embodiment. The flowchart may be performed by an optimization system 700 to be described in FIG. 7. Also, in the flowchart, the method will be described as having a plurality of steps. However, at least some of the steps may be performed in a changed order, performed in combination with another step, omitted, divided into sub-steps and then performed, or performed in addition to one or more steps that are not shown.

In S102, the optimization system 700 repeatedly learns the feature extraction network 102 and the classification network 104 of the deep learning model 100 using the unsupervised domain adaptation technique. The optimization system 700 may connect the feature extraction network 102 and the classification network 104 in a direct manner and then apply a generative model. Thus, it is possible to improve the performance of the feature extraction network 102 and the classification network 104. The generative model may include a generative adversarial network (GAN), a variational autoencoder (VAE), and the like.

As an example, the optimization system 700 may repeatedly learn the feature extraction network 102 and the classification network 104 such that the feature extraction network 102 and the classification network 104 become a generator and a discriminator of the GAN, respectively, in order to improve the performance of the feature extraction network 102 and the classification network 104. S102 will be described in detail below with reference to FIG. 3.

In S104, the optimization system 700 selects one of the plurality of layers in the feature extraction network 102. In this case, the optimization system 700 may randomly select one of the plurality of layers in the feature extraction network 102.

In S106, the optimization system 700 applies a first model, a second model, and a third model set for the selected layer. Here, the first model is a model for increasing a layer size, the second model is a model for maintaining a layer size, and the third model is a model for decreasing a layer size. Here, the size of the layer may be, for example, the number or dimension of channels, the number of parameters, and the like of the layer.

In S108, the optimization system 700 repeatedly learns a first model, a second model, and a third model with respect to the selected layer. The optimization system 700 may acquire results learned when the first model, the second model, and the third model are applied to the selected layer on the basis of the source dataset. In this case, the optimization system 700 may acquire the results learned when the first model, the second model, and the third model are applied to the selected layer on the basis of the source dataset while the feature extraction network 102 and the classification network 104 learned in S102 are maintained. Also, the optimization system 700 may learn the first model, the second model, and the third model for the selected layer such that the probability that the plurality of classifiers 302 and 304 correctly output classes corresponding to the source dataset is increased. S108 will be described in detail below with reference to FIG. 5.

In S110, the optimization system 700 calculates scores for the first model, the second model, and the third model. Here, the scores are indices that indicate the conformance of the first model, the second model, and the third model to the selected layer. For example, it can be seen that the conformance of the corresponding model to the selected layer increases as the score increases. The optimization system 700 may calculate the scores for the first model, the second model, and the third model in consideration of the weights in the models (i.e., the first model, the second model, and third model), the sum of losses resulting from the application of each model, etc.

In S112, the optimization system 700 selects one of the first model, the second model, and the third model according to the scores calculated in S110. In detail, the optimization system 700 may select one model having the highest score from among the first model, the second model, and the third model. As an example, a model having the smallest loss among the first model, the second model, and the third model may be the model having the highest score. In this case, the optimization system 700 may select the model having the smallest loss from among the first model, the second model, and the third model.

In S114, the optimization system 700 adjusts the size of the selected layer according to the selected model. In S112, as an example, when the third model (i.e., the model for decreasing the size of the layer) is selected, the optimization system 700 may reduce the size of the selected layer. In detail, the optimization system 700 may reduce the number or dimension of channels, the number of parameters, and the like of the selected layer.

In S116, the optimization system 700 determines whether each of the plurality of layers has satisfied a predetermined convergence condition. When it is determined that each of the plurality of layers does not satisfy the predetermined convergence condition, the optimization system 700 repeats S104 to S114 until each of the plurality of layers satisfies the predetermined convergence condition. The optimization system 700 may randomly select one of the plurality of layers again and may repeatedly perform the above process. Here, the convergence condition may be a condition that the second model is repeatedly selected for each of the plurality of layers in the feature extraction network 102. That is, when it is determined that the size of each layer no longer needs to be adjusted as a result of repeatedly performing S104 to S112, the optimization system 700 may determine that each of the plurality of layers satisfies the convergence condition.

In S118, since each of the plurality of layers satisfies the convergence condition, the optimization system 700 may determine that the structure of the deep learning model 100 is optimized for the target dataset and then may terminate the learning.

Figure 3:
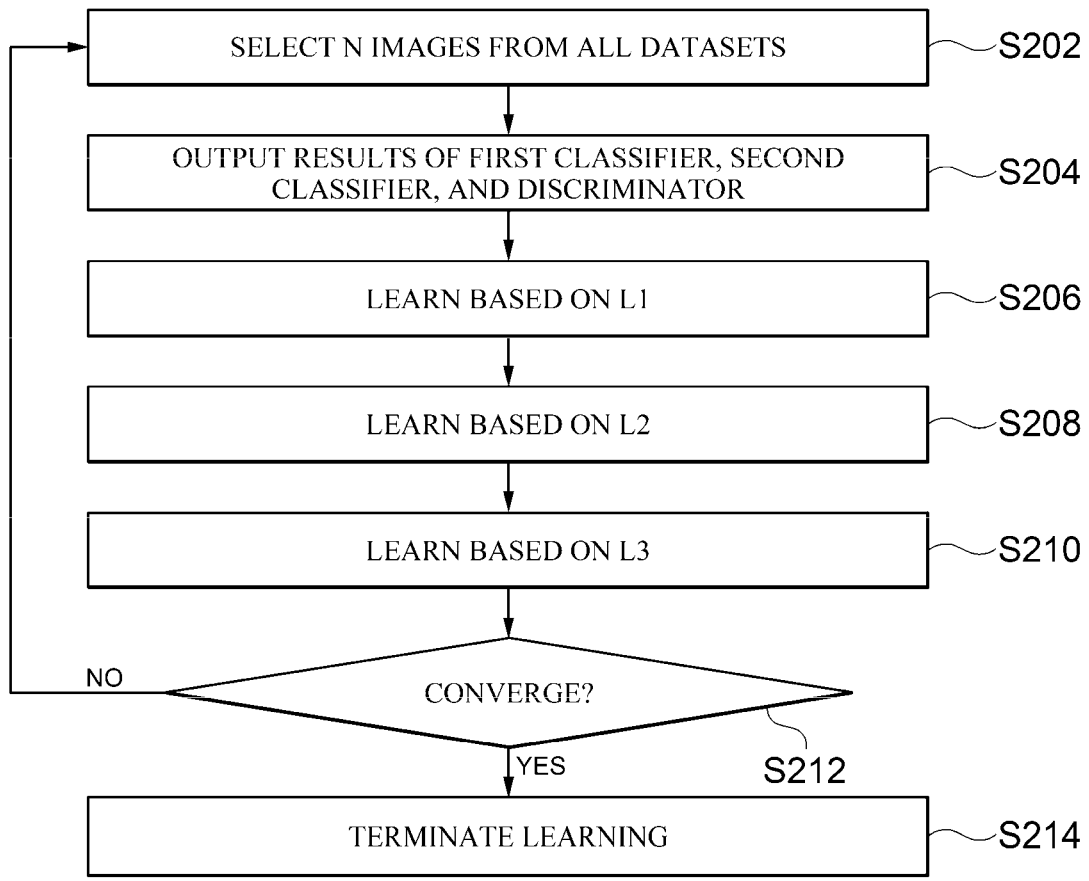
FIG. 3 is a flowchart illustrating S102 of FIG. 2.

FIG. 3 is a flowchart illustrating S102 of FIG. 2. As described above, the optimization system 700 may repeatedly learn the feature extraction network 102 and the classification network 104 such that the feature extraction network 102 and the classification network 104 become a generator and a discriminator of the GAN, respectively, in order to improve the performance of the feature extraction network 102 and the classification network 104. The GAN is a network for improving the performance of both of the networks by enabling the two models, that is, the generator and the discriminator to compete with each other. The purpose of the generator is to trick the discriminator by generating fake data similar to real data, and the purpose of the discriminator is to discriminate fake data generated by the generator from real data. Through such adversarial training, it is possible to competitively improve the performance of the generator and the discriminator. Here, the feature extraction network 102 corresponds to the generator of the GAN, and the classification network 104 corresponds to the discriminator of the GAN. A training method for improving the performance of the first feature extraction network 102 and the classification network 104 will be described in detail below.

In S202, the optimization system 700 selects N pieces of data (or images) from all of the datasets (i.e., source dataset+ target dataset).

In S204, the optimization system 700 outputs results of the first classifier 302, the second classifier 304, and the discriminator unit 306 with respect to the selected pieces of data. Here, the results of the first classifier 302, the second classifier 304, and the discriminator unit 306 may be expressed as $p_1(y|x_i)$, $p_2(y|x_i)$, and $p_3(q|x_i)$. The definitions of the related equations are as follows.

TABLE 1

| Expression | Definition |
|---|---|
| $x_i$ | An $i^{th}$ piece of data (or image) in all of the datasets (source dataset + target dataset) |
| $y^o_i$ | A class value assigned to the $i^{th}$ piece of data (which exists only when $x_i$ is in the source dataset) |

TABLE 1-continued

| Expression | Definition |
|---|---|
| $q^o_i$ | Whether the $i^{th}$ piece of data is in the target dataset ($x_i$ is the source dataset when $q^o_i = 0$, and $x_i$ is the target dataset when $q^o_i = 1$) |
| N | The number of pieces of data in all of the datasets |
| M | The number of pieces of data in the source dataset out of all of the datasets |
| $p_1(y|x_i)$ | The probability of the class that is output when $x_i$ is input to the first classifier |
| $p_2(y|x_i)$ | The probability of the class that is output when $x_i$ is input to the second classifier |
| $p_3(q|x_i)$ | The probability of $x_i$ being discriminated as the target dataset when $x_i$ is input to the discriminator |

In S206, the optimization system 700 learns the first classifier 302 and the second classifier 304 such that the loss $L_1$ of Equation 1 below is minimized for M pieces of data extracted from the source dataset. Equation 1 aims to perform the learning such that the probability of correctly outputting classes of the source dataset for the input data on the basis of the cross-entropy of the first classifier 302 and the second classifier 304 is increased.

$$L_1 = -\sum_{i=1}^{M} \left\{ y_i^{o^T} \log(p_1(y|x_i)) + y_i^{o^T} \log(p_2(y|x_i)) \right\}. \quad \text{[Equation 1]}$$

In S208, the optimization system 700 learns the first classifier 302, the second classifier 304, and the discriminator unit 306 such that the loss $L_2$ of Equation 2 below is minimized for N pieces of data extracted from all of the datasets. Equation 2 aims to interfere with determination of whether input data corresponds to a source dataset or a target dataset by minimizing a negative value of a distance between estimates of the first classifier 302 and the second classifier 304 in order to make the two estimates different from each other and also minimize a negative value of $\log(p_3(q|x_i))$. Through this process, it is possible to prevent the entire learning of the deep learning model 100 from overfitting. Here, k is a user setting parameter for norm calculation, and λ is also a user setting parameter.

$$L_2 = \sum_{i=1}^{N} -\|p_1(y|x_i) - p_2(y|x_i)\|_k + \lambda q_i^o \log(p_3(q|x_i)). \quad \text{[Equation 2]}$$

In S210, the optimization system 700 learns the first classifier 302, the second classifier 304, and the discriminator unit 306 such that the loss $L_3$ of Equation 3 below is minimized for data extracted from the target dataset. $L_3$ in Equation 3 has an opposite sign to that of $L_2$ in FIG. 2 and thus has an opposite role to that of $L_2$ in FIG. 2. That is, Equation 3 aims to correctly determine whether input data corresponds to a source dataset or a target dataset by deriving the estimates of the first classifier 302 and the second classifier 304 to be equal to each other and maximizing the negative value of $\log(p_3(q|x_i))$.

$$L_3 = \sum_{i=1}^{N} \|p_1(y|x_i) - p_2(y|x_i)\|_k - \lambda q_i^o \log(p_3(q|x_i)) \quad \text{[Equation 3]}$$

In S212, the optimization system 700 determines whether each of the learned results in S206 to S210 has satisfied a predetermined convergence condition. Here, the convergence condition may be, for example, a condition that variations $L_1$, $L_2$, and $L_3$ in Equations 1 to 3 are maintained at or under predetermined values.

In S214, when the convergence condition is satisfied, the optimization system 700 may determine that the performance of the feature extraction network 102 and the classification network 104 is sufficiently improved and may terminate the learning.

Figure 4A:
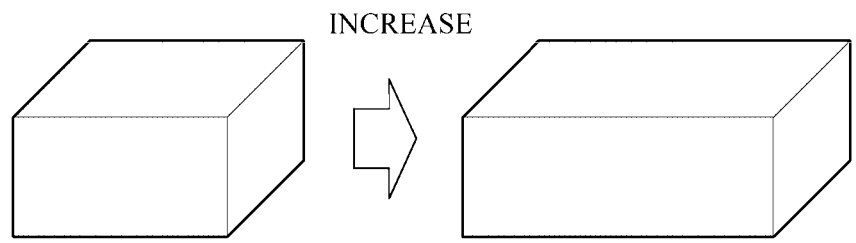
FIGS. 4A to 4C illustrate a first model, a second model, and a third model according to an example embodiment.
Figure 4B:
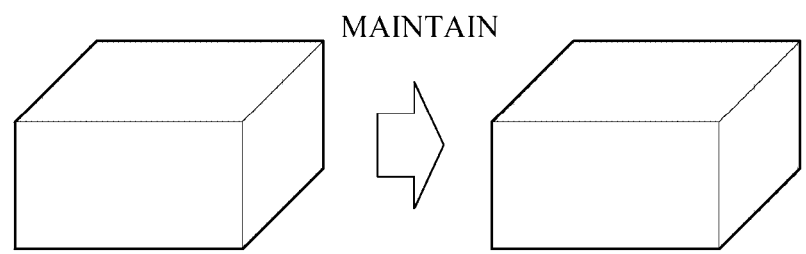
Figure 4C:
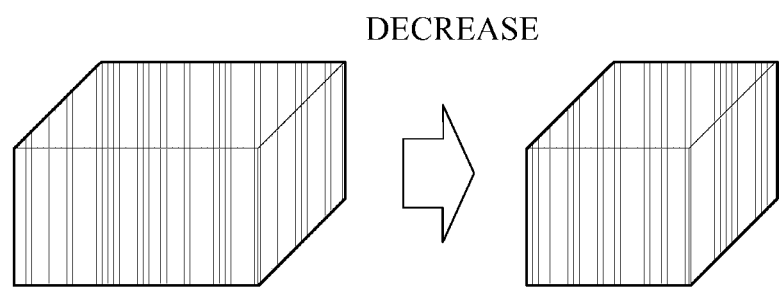

FIGS. 4A to 4C illustrate a first model, a second model, and a third model according to an example embodiment. FIGS. 4A to 4C indicate the first model, the second model, and the third model, respectively. As described above, the first model is a model for increasing a layer size, the second model is a model for maintaining a layer size, and the third model is a model for decreasing a layer size.

Figure 5:
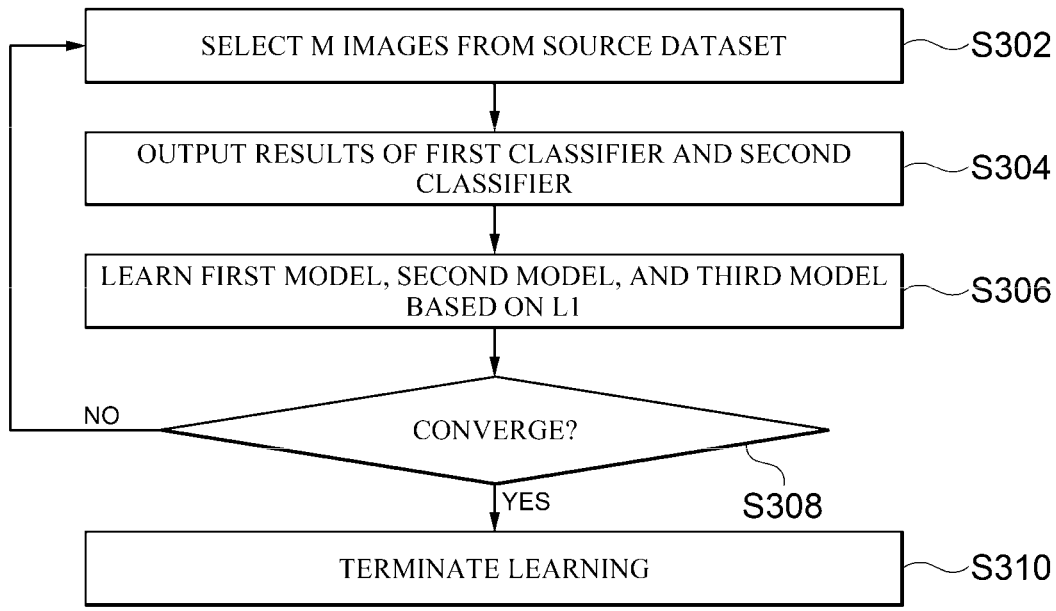
FIG. 5 is a flowchart illustrating S108 of FIG. 2.

FIG. 5 is a flowchart illustrating S108 of FIG. 2. As described above, the optimization system 700 selects one of the plurality of layers in the feature extraction network 102 and acquires results learned when the first model, the second model, and the third model are applied to the selected layer on the basis of the source dataset. In this case, the optimization system 700 may acquire the results learned when the first model, the second model, and the third model are applied to the selected layer while maintaining the feature extraction network 102 and the classification network 104 learned in S102 and may adjust the structure of the deep learning model 100. This method enables faster learning compared to a general deep learning method in which learning is newly performed after the structure of the deep learning model 100 is adjusted. Hereinafter, a method of acquiring results learned when the first model, the second model, and the third model are applied to the selected layer will be described in detail below.

In S302, the optimization system 700 randomly selects M pieces of data from the source dataset.

In S304, the optimization system 700 outputs results of the first classifier 302 and the second classifier 304 (i.e., $p_1(y|x_t)$ and $p_2(y|x_t)$) with respect to the selected pieces of data.

In S306, the optimization system 700 may learn the first model, the second model, and the third model with respect to the selected layer such that the probability that the first classifier 302 and the second classifier 304 correctly output classes corresponding to the source dataset with respect to the M pieces of data extracted from the source dataset is increased. The optimization system 700 may learn the first model, the second model, and the third model such that the loss $L_1$ of Equation 1 above is minimized. In this case, the optimization system 700 may learn the first model, the second model, and the third model while all weights included in the feature extraction network 102, the first classifier 302, and the second classifier 304 are fixed.

In S308, the optimization system 700 determines whether each of the learned results in S306 has satisfied a predetermined convergence condition. Here, the convergence condition may be, for example, a condition that the variation $L_1$ in Equation 1 is maintained at or under a predetermined value.

Figure 6:
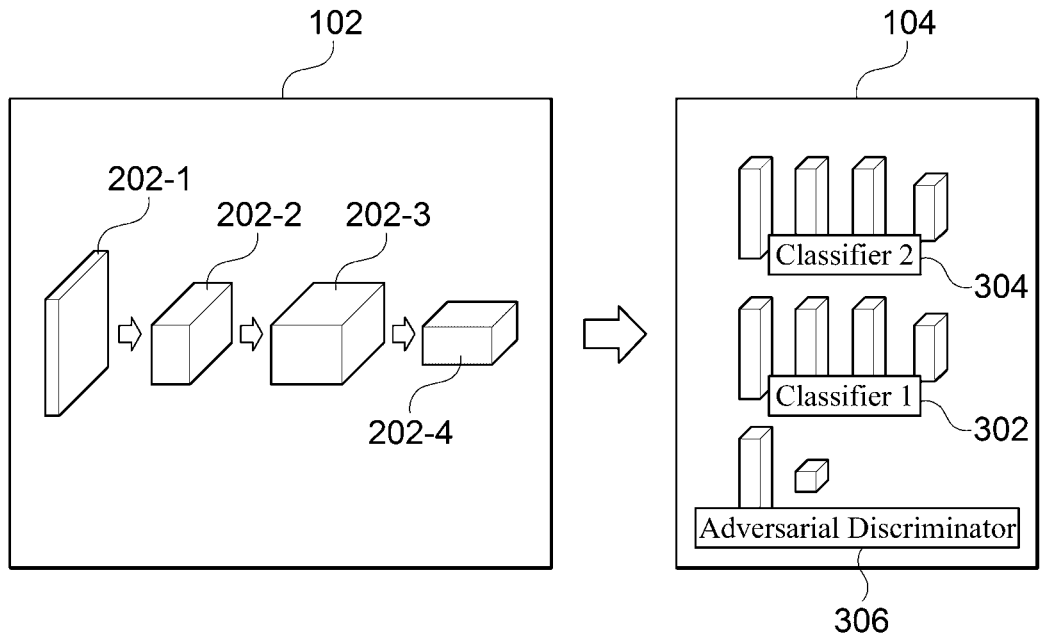
FIG. 6 illustrates a process of adjusting a layer size according to an example embodiment.

FIG. 6 illustrates a process of adjusting a layer size according to an example embodiment. As described above, the optimization system 700 selects one of the plurality of layers in the feature extraction network 102, selects one of the first model, the second model, and the third model on the basis of the results learned when the models are applied to the selected layer, and adjusts the size of the selected layer according to the selected model.

As an example, the optimization system 700 may determine to select a fourth layer 202-4 and adjust the structure of the deep learning model 100 such that the size of the fourth layer 202-4 is reduced (i.e., select the third model and adjust the size of the fourth layer according to the third model) according to the learning result. Thus, it can be seen that the fourth layer 202-4 in FIG. 6 is reduced in size compared to FIG. 1. The optimization system 700 may repeatedly perform the above process even on the first layer 202-1, the second layer 202-2, and the third layer 202-3. Also, the optimization system 700 may re-select the fourth layer 202-4 and then re-adjust the size of the fourth layer 202-4.

Figure 7:
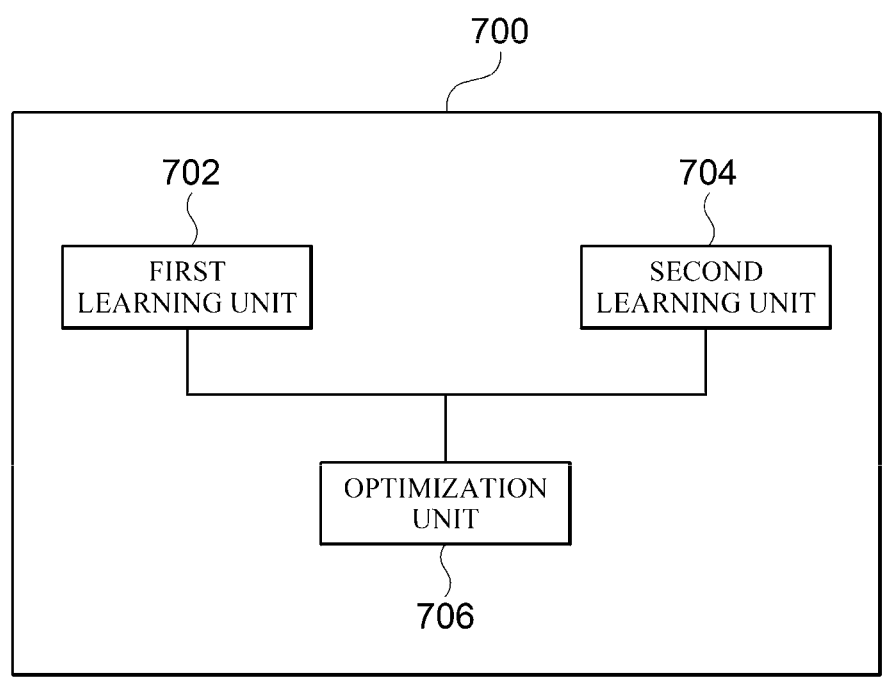
FIG. 7 is a block diagram showing a detailed configuration of an optimization system according to an example embodiment.

FIG. 7 is a block diagram showing a detailed configuration of the optimization system 700 according to an example embodiment. As shown in FIG. 7, the optimization system 700 according to an example embodiment includes a first learning unit 702, a second learning unit 704, and an optimization unit 706.

The first learning unit 702 repeatedly learns the feature extraction network 102 and the classification network 104 using the unsupervised domain adaptation technique. The first learning unit 702 may connect the feature extraction network 102 and the classification network 104 in a direct manner and then apply a generative model. Thus, it is possible to improve the performance of the feature extraction network 102 and the classification network 104. As an example, the first learning unit 702 may repeatedly learn the feature extraction network 102 and the classification network 104 such that the feature extraction network 102 and the classification network 104 become a generator and a discriminator of the GAN, respectively, in order to improve the performance of the feature extraction network 102 and the classification network 104.

The second learning unit 704 determines the structure of the deep learning model 100 suitable for the target dataset. To this end, the second learning unit 704 may include a first model for increasing a layer size in the feature extraction network 102, a second model for maintaining the size of the layer, and a third model for decreasing the size of the layer.

The second learning unit 704 may randomly select one of the plurality of layers in the feature extraction network 102 and may acquire results learned when the first model, the second model, and the third model are applied to the selected layer on the basis of the source dataset. In detail, the second learning unit 704 may learn the first model, the second model, and the third model for the selected layer such that the probability that the first classifier 302 and the second classifier 304 correctly output classes corresponding to the source dataset is increased. In this case, the second learning unit 704 may learn the first model, the second model, and the third model for the selected layer while the feature extraction network 102 and the classification network 104 learned in the first learning unit 702 are maintained.

The optimization unit 706 optimizes the structure of the deep learning model 100 according to the target dataset. In detail, the optimization unit 706 may select one of the first model, the second model, and the third model according to the learning result of the second learning unit 704 and may adjust the size of the selected layer according to the selected model. As an example, the optimization unit 706 may select a model having the smallest loss from among the first model, the second model, and the third model according to the learning result of the second learning unit 704 and may adjust the size of the selected layer according to the selected model.

Subsequently, the second learning unit 704 may randomly select one of the plurality of layers again and may learn the first model, the second model, and the third model for the randomly selected layer. The optimization unit 706 may repeatedly perform the above process and adjust the size the randomly selected layer. In this way, the second learning unit 704 and the optimization unit 706 may repeatedly perform a learning and optimization task on each of the plurality of layers in the feature extraction network 102. The optimization unit 706 may adjust the size of each of the plurality of layers until the second model is repeatedly selected for each of the plurality of layers. However, the present disclosure is not limited thereto, and the optimization unit 706 may repeat the optimization task a predetermined number of times and then terminate the learning.

Figure 8:
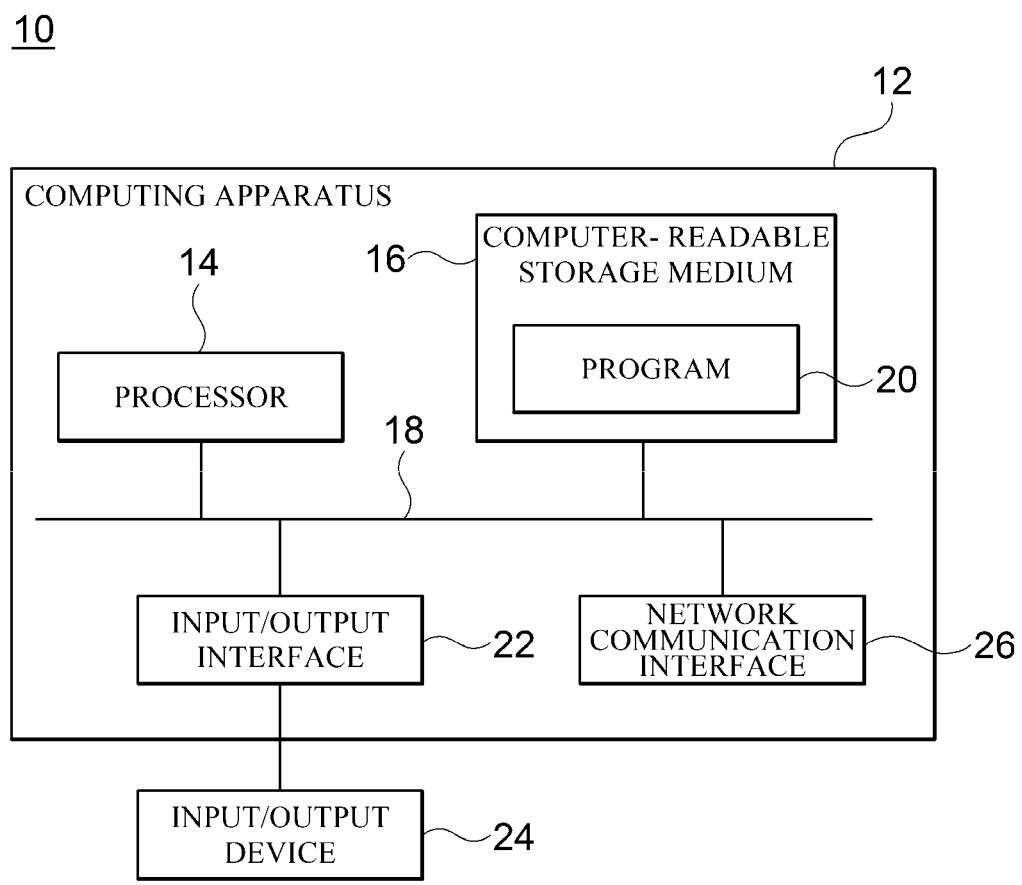
FIG. 8 is a block diagram illustrating a computing environment including a computing apparatus suitable for use in example embodiments.

FIG. 8 is a block diagram illustrating a computing environment including a computing apparatus suitable for use in example embodiments. In the illustrated embodiment, each component may have a function and capability that differs from those described below, and an additional component may be included in addition to those in the following description.

As shown, a computing environment 10 includes a computing apparatus 12. According to an embodiment, the computing apparatus 12 may be the optimization system 700 or one or more components included in the optimization system 700.

The computing apparatus 12 includes at least one processor 14, a computer-readable storage medium 16, and a communication bus 18. The processor 14 may enable the computing apparatus 12 to operate according to the aforementioned example embodiment. For example, the processor 14 may execute one or more programs stored in the computer-readable storage medium 16. The one or more programs may include one or more computer executable instructions which may be configured to enable the computing apparatus 12 to perform operations according to an example embodiment when the instructions are executed by the processor 14.

The computer-readable storage medium 16 is configured to store computer-executable instructions, program codes, program data, and/or other suitable forms of information. The program 20 stored in the computer-readable storage medium 16 includes a set of instructions executable by the processor 14. In an embodiment, the computer-readable storage medium 16 may be a memory (a volatile memory such as a random access memory, a non-volatile memory, or an appropriate combination thereof), one or more magnetic disk storage devices, optical disk storage devices, flash memory devices, other forms of storage media that may be accessed by the computing apparatus 12 and are configured to store desired information, or a suitable combination thereof.

The communication bus 18 connects the processor 14, the computer-readable storage medium 16, and various other components of the computing apparatus 12 to one another.

Also, the computing apparatus 12 may include one or more input/output interfaces 22 for providing an interface for one or more input/output devices 24, and one or more network communication interfaces 26. The input/output interfaces 22 and the network communication interfaces 26 are connected to the communication bus 18. The input/output devices 24 may be connected to other components of the computing apparatus 12 through the input/output interfaces 22. The input/output devices 24 may include input devices such as a pointing device (a mouse, a track pad, etc), a keyboard, a touch input device (a touchpad, a touch screen, etc.), a voice or sound input device, various kinds of sensor devices, and/or a capture device and/or may include output devices such as a display device, a printer, a speaker, and/or a network card. The input/output devices 24 may be included in the computing apparatus 12 as components of the computing apparatus 12 and may be connected to the computing apparatus 12 as separate devices distinct from the computing apparatus 12.

According to example embodiments, by automatically discovering and optimizing the structure of the deep learning model appropriately for a target dataset without fixing the structure of the deep learning model, it is possible to generate a model structure capable of having high performance on the target dataset and also saving resources.

Although the disclosure has been described in detail with reference to exemplary embodiments, it will be understood by those skilled in the art that various changes may be made without departing from the spirit or scope of the disclosure. Therefore, the scope of the present disclosure is not to be construed as being limited to the described embodiments, but is defined by the appended claims as well as equivalents thereto.

What is claimed is:

1. An optimization system of a deep learning model including a feature extraction network having a plurality of layers for performing feature extraction on input data corresponding to a source dataset to which a class is assigned or a target dataset to which no class is assigned, and a classification network including a plurality of classifiers for outputting one class corresponding to the source dataset on the basis of an extracted feature and a discrimination unit configured to determine whether the input data corresponds to the source dataset or the target dataset, the optimization system comprising:
   a first learning unit configured to repeatedly learn the feature extraction network and the classification network using an unsupervised domain adaptation technique;
   a second learning unit having a first model for increasing a layer size, a second model for maintaining a layer size, and a third model for decreasing a layer size, the second learning unit configured to select one of the plurality of layers and acquire learned results when the first model, the second model, and the third model are applied to the selected layer on the basis of the source dataset; and
   an optimization unit configured to select one of the first model, the second model, and third model according to the learned results of the second learning unit and adjust a size of the selected layer according to the selected model.

2. The optimization system of claim 1, wherein the first learning unit is further configured to repeatedly learn the feature extraction network and the classification network such that the feature extraction network and the classification network become a generator and a discriminator of a generative adversarial network (GAN), respectively, in order to improve performance of the feature extraction network and the classification network.

3. The optimization system of claim 1, wherein the second learning unit is further configured to randomly select one of the plurality of layers and then randomly select another one of the plurality of layers again after the randomly selected layer is adjusted in size by the optimization unit.

4. The optimization system of claim 1, wherein the second learning unit is further configured to acquire learned results when the first model, the second model, and the third model are applied to the selected layer on the basis of the source dataset while maintaining the feature extraction network and the classification network learned in the first learning unit.

5. The optimization system of claim 1, wherein,
the plurality of classifiers comprises a first classifier and a second classifier, and
the second learning unit is further configured to learn the first model, the second model, and the third model for the selected layer such that the probability that the first classifier and the second classifier correctly output classes corresponding to the source dataset is increased.

6. The optimization system of claim 5, wherein the optimization unit is further configured to select a model having a smallest loss from among the first model, the second model, and the third model according to the learned results of the second learning unit.

7. The optimization system of claim 1, wherein the optimization unit is further configured to adjust a size of each of the plurality of layers until the second model is repeatedly selected for each of the plurality of layers according to the learned results of the second learning unit.

8. An optimization method of a deep learning model including a feature extraction network having a plurality of layers for performing feature extraction on input data corresponding to a source dataset to which a class is assigned or a target dataset to which no class is assigned, and a classification network including a plurality of classifiers for outputting one class corresponding to the source dataset on the basis of an extracted feature and a discrimination unit configured to determine whether the input data corresponds to the source dataset or the target dataset, the optimization method comprising:
repeatedly learning, by a first learning unit, the feature extraction network and the classification network using an unsupervised domain adaptation technique;
selecting, by a second learning unit having a first model for increasing a layer size, a second model for maintaining a layer size, and a third model for decreasing a layer size, one of the plurality of layers;
acquiring, by the second learning unit, learned results when the first model, the second model, and the third model are applied to the selected layer on the basis of the source dataset;
selecting, by an optimization unit, one of the first model, the second model, and third model according to the learned results of the second learning unit; and
adjusting, by the optimization unit, a size of the selected layer according to the selected model.

9. The optimization method of claim 8, wherein the repeatedly learning of the feature extraction network and the classification network comprises:
repeatedly learning the feature extraction network and the classification network such that the feature extraction network and the classification network become a generator and a discriminator of a generative adversarial network (GAN), respectively, in order to improve performance of the feature extraction network and the classification network.

10. The optimization method of claim 8, wherein the selecting of one of the plurality of layers comprises:
randomly selecting one of the plurality of layers and then randomly selecting another one of the plurality of layers again after the randomly selected layer is adjusted in size by the optimization unit.

11. The optimization method of claim 8, wherein the acquiring of the learned results comprises:
acquiring the learned results when the first model, the second model, and the third model are applied to the selected layer on the basis of the source dataset while the feature extraction network and the classification network learned in first learning unit are maintained.

12. The optimization method of claim 8, wherein,
the plurality of classifiers comprises a first classifier and a second classifier, and
the acquiring of the learned results comprises:
learning the first model, the second model, and the third model for the selected layer such that the probability that the first classifier and the second classifier correctly output classes corresponding to the source dataset is increased.

13. The optimization method of claim 8, wherein the selecting of one of the first model, the second model, and the third model according to the learned results of the second learning unit comprises:
selecting a model having a smallest loss from among the first model, the second model, and the third model according to the learned results of the second learning unit.

14. The optimization method of claim 8, wherein the adjusting of the size of the selected layer comprises:
adjusting a size of each of the plurality of layers until the second model is repeatedly selected for each of the plurality of layers according to the learned results of the second learning unit.

* * * * *